(12) United States Patent
Ek et al.

(10) Patent No.: US 12,503,533 B2
(45) Date of Patent: Dec. 23, 2025

(54) PROCESS FOR PRODUCING A POLYETHYLENE COMPOSITION USING MOLECULAR WEIGHT ENLARGEMENT

(71) Applicant: Borealis AG, Vienna (AT)

(72) Inventors: Carl-Gustaf Ek, Stenungsund (SE); Denis Yalalov, Stenungsund (SE); Franz Ruemer, Linz (AT); Mattias Bergqvist, Stenungsund (SE)

(73) Assignee: BOREALIS GMBH, Vienna (AT)

( * ) Notice: Subject to any disclaimer, the term of this patent is extended or adjusted under 35 U.S.C. 154(b) by 777 days.

(21) Appl. No.: 17/778,087

(22) PCT Filed: Nov. 26, 2020

(86) PCT No.: PCT/EP2020/083537
§ 371 (c)(1),
(2) Date: May 19, 2022

(87) PCT Pub. No.: WO2021/105299
PCT Pub. Date: Jun. 3, 2021

(65) Prior Publication Data
US 2022/0411547 A1 Dec. 29, 2022

(30) Foreign Application Priority Data
Nov. 29, 2019 (EP) .................................. 19212606

(51) Int. Cl.
| | | |
|---|---|---|
| *C08F 220/14* | (2006.01) | |
| *B29C 48/00* | (2019.01) | |
| *B29C 48/40* | (2019.01) | |
| *C08F 210/02* | (2006.01) | |
| *C08F 230/08* | (2006.01) | |
| *C08K 5/14* | (2006.01) | |
| *B29K 23/00* | (2006.01) | |
| *B29K 33/00* | (2006.01) | |
| *B29L 31/26* | (2006.01) | |

(52) U.S. Cl.
CPC .......... *C08F 210/02* (2013.01); *B29C 48/022* (2019.02); *B29C 48/40* (2019.02); *C08F 220/14* (2013.01); *C08F 230/085* (2020.02); *C08K 5/14* (2013.01); *B29K 2023/08* (2013.01); *B29K 2033/08* (2013.01); *B29L 2031/265* (2013.01)

(58) Field of Classification Search
CPC ........ C08F 8/00; C08F 210/02; C08F 220/14; C08F 230/085; C08F 2500/12; C08F 8/12; C08K 5/14; C08K 5/20; C08L 23/0892
See application file for complete search history.

(56) References Cited

U.S. PATENT DOCUMENTS

2011/0111155 A1*  5/2011  Ek ........................... C08L 43/00
428/36.9

FOREIGN PATENT DOCUMENTS

| EP | 1916672 A1 | 4/2008 |
|---|---|---|
| WO | 93/07184 A1 | 4/1993 |
| WO | 00/68314 A1 | 11/2000 |
| WO | 2019086948 A2 | 5/2019 |

OTHER PUBLICATIONS

International Search Report of Application No. PCT/EP2020/083537 dated Jan. 21, 2021.

* cited by examiner

*Primary Examiner* — Arrie L Reuther
*Assistant Examiner* — Devin Mitchell Darling
(74) *Attorney, Agent, or Firm* — Lippes Mathias LLP

(57) ABSTRACT

The present invention provides a process for producing a polyethylene composition by treating a cross-linkable ethylene copolymer containing monomer units with hydrolysable silane-groups and polar monomer units. The invention further provides a treated cross-linkable polyethylene composition 5 obtained by the process and a silane-crosslinked polyethylene composition obtained by the process. The invention further provides articles comprising the treated cross-linkable polyethylene composition or comprising the silane-crosslinked polyethylene composition.

10 Claims, No Drawings

PROCESS FOR PRODUCING A POLYETHYLENE COMPOSITION USING MOLECULAR WEIGHT ENLARGEMENT

CROSS REFERENCE TO RELATED APPLICATIONS

This is a 371 of PCT Application No. PCT/EP2020/083537, filed Nov. 26, 2020, which claims the benefit of European Application No. 19212606.8, filed Nov. 29, 2019, the contents of which are incorporated herein in their entirety.

The present invention provides a process for producing a polyethylene composition by treating a cross-linkable ethylene copolymer containing monomer units with hydrolysable silane-groups and polar monomer units. The invention further provides a treated cross-linkable polyethylene composition obtained by the process and a silane-crosslinked polyethylene composition obtained by the process. The invention further provides articles comprising the treated cross-linkable polyethylene composition or comprising the silane-crosslinked polyethylene composition.

Ethylene based materials are used for several applications, for instance for profiles, seals or gaskets. To be suitable for making profiles, seals and gaskets out of these materials, the materials need to fulfill specific properties. In particular, the material shall have appropriate properties in terms of softness, compression set also at elevated temperature for demanding applications, dimensional stability and keeping the profile shape during and after manufacturing, weather-ability and aging performance, and finally processability also for complex designs. Important is to provide a balance of the above mentioned properties, that is for each specific property the values need to be within a specific range so as to be suitable for a certain application, for e.g. automotive or building & construction.

For gasket applications for window or door profiles in building & construction and even more into seals and gaskets for the automotive industry, the needs on flexibility and softness in combination with high compression set values are crucial for their performance. The softness is often expressed as Shore A values. The compression set requirements for these type of products often require a certain crosslinking degree and lower values of compression set are sought for.

Typical materials used for manufacturing of seals and gaskets are made of EPDM (ethylene propylene diene monomer), TPU (thermoplastic urethane) or other types of TPV's (thermoplastic vulcanizates) for more demanding use like automotive or industrial applications. For less demanding applications, for example windows and doors in building & construction and for appliances, EPDM and TPU are also used, however PVC or TPS (thermoplastic styrol polymers) provide a good performance at a lower cost and practically taken over the lead in this segment.

Polyolefin elastomer materials, silane grafted and preferably crosslinked are fairly recently introduced on the market and used to some extent for more demanding applications, mainly competing with EPDM and both types are comparatively expensive to manufacture.

A cross-linkable ethylene-alkyl(meth)acrylate-unsaturated silane terpolymer is disclosed in WO 00/68314. The crosslinking is performed by moisture curing under ambient temperatures using a benzene sulphonic acid based catalyst.

However, extrusion of such ethylene-alkyl acrylate-silane terpolymers into cables, pipes, sheets or profiles requires a suitable melt rheology and melt viscosity at the preferred temperature for the extrusion process to enable production of commercially viable products.

A key problem when producing ethylene-alkyl acrylate-silane terpolymers is to produce a combination of sufficiently soft products with sufficiently low compression set values and at the same time a melt viscosity suitable for extrusion. The latter is of importance as the melt flow rate levels are far above suitable extrusion conditions, making extrusion at commercial conditions practically impossible, particularly when complex shaped profiles like seals and gaskets are manufactured.

Also, both the melt shear thinning behaviour (SHI) and the melt elasticity have an impact on how well the shape of a complex profile is formed in the die and kept during manufacturing and after exiting the die and until solidification.

Hence, there is a need in the art to provide a process which allows improved tailoring of the properties softness, compression set, melt viscosity suitable for extrusion, melt shear thinning behaviour (SHI) and at the same time melt elasticity of polyethylene compositions for the desired application.

There is also a need in the art to provide polyethylene compositions having all the aforementioned properties improved or tailored at the same time for the desired application.

It is therefore an object of the present invention to provide a process for producing a polyethylene composition having improved softness, improved compression set and at the same time improved melt viscosity suitable for extrusion.

It is a further objection that the process also allows improving melt shear thinning behaviour (SHI) and at the same time melt elasticity of polyethylene compositions.

It is still a further object of the invention to provide polyethylene compositions having all the aforementioned properties improved or tailored at the same time. Still a further object is to provide articles comprising such polyethylene compositions.

The present invention is based on the finding that the above objects can be achieved by treating a cross-linkable ethylene copolymer containing monomer units with hydrolysable silane-groups and containing polar monomer units, so as to enlarge the molecular weight of the cross-linkable ethylene copolymer. Thereby, the copolymer is made suitable for extrusion.

The present invention therefore provides a process for producing a polyethylene composition, comprising the steps of
 a) providing a cross-linkable ethylene copolymer composition (A) having a first $MFR_2$, comprising
  (A1) monomer units with hydrolysable silane-groups, and
  (A2) polar monomer units,
 b) adding a free radical generator (B) to the cross-linkable ethylene copolymer composition (A),
 c) treating the cross-linkable ethylene copolymer composition (A) with the free radical generator (B) to obtain a treated cross-linkable ethylene copolymer composition (A) having a second $MFR_2$,
wherein the second $MFR_2$ is lower than the first $MFR_2$.

"Treating the cross-linkable ethylene copolymer composition (A) with the free radical generator (B)" in step c) means that composition (A) including the added free radical generator (B) is submitted to conditions where decomposition of (B) takes place and hence the formation of free radicals occurs.

The present invention provides several advantages. The treating step c) using the free radical generator (B) causes a molecular weight enlargement of the cross-linkable ethylene copolymer composition (A). This is, inter alia, reflected by a reduction of the melt flow rate (MFR), in particular the second $MFR_2$ of the treated cross-linkable ethylene copolymer composition (A) being lower than the first $MFR_2$ of the non-treated cross-linkable ethylene copolymer composition (A) before treatment.

The main benefits with this above described molecular adjustment methodology for cross-linkable ethylene copolymers containing monomer units with hydrolysable silane-groups and polar monomer units are, in general, to enable both a larger property window and a larger processing window for the cross-linkable ethylene copolymers, as well as to enable tailoring the properties and processing properties according to application needs. In particular, the benefits comprise:
  i. enabling extrusion/moulding of soft products preferably used in profiles, seals and gaskets applications,
  ii. improving the rheology/processability to fit complex profile manufacturing,
  iii. enabling the use of in-reactor produced materials compared with grafted solutions in terms of homogeneity improvement, complexity and cost reduction for soft products, particularly for fitting seals and gasket applications, and
  iv. improvement and/or synergistic effects for properties such as softness, compression set, gel content and dynamic mechanical properties.

The cross-linkable ethylene copolymer composition (A) contains monomer units with hydrolysable silane-groups (A1) and polar monomer units (A2).

Cross-linkable ethylene copolymer composition (A) may either comprise, or consist of, one or more cross-linkable ethylene copolymer(s) comprising both monomer units (A1) and (A2), or may comprise, or consist of, a mixture of different polymers which comprises ethylene copolymers with either monomer units (A1) or monomer units (A2) or both monomer units (A1) and (A2). However, regardless which polymers are used, the cross-linkable ethylene copolymer composition (A) must contain ethylene copolymers so that both (A1) and (A2) monomer units are present in composition (A).

Preferably, cross-linkable ethylene copolymer composition (A) comprises, or consists of, one or more cross-linkable ethylene copolymer(s) comprising both monomer units (A1) and (A2), still more preferably cross-linkable ethylene copolymer composition (A) comprises, or consists of, one cross-linkable ethylene copolymer(s) comprising both monomer units (A1) and (A2), and most preferably cross-linkable ethylene copolymer composition (A) consists of one cross-linkable ethylene copolymer(s) comprising both monomer units (A1) and (A2).

It is preferred that in the preferred embodiment where cross-linkable ethylene copolymer composition (A) comprises one or more, preferably one, ethylene copolymer(s) comprising both monomer units (A1) and (A2) that the one or more, preferably one, ethylene copolymer(s) comprising both monomer units (A1) and (A2) is present in an amount of at least 10 wt. %, more preferably of at least 15 wt. % of the total amount of cross-linkable ethylene copolymer composition (A).

In the preferred embodiments where cross-linkable ethylene copolymer composition (A) comprises one or more ethylene copolymer(s) comprising both monomer units (A1) and (A2), it is preferred that the composition (A) also comprises an ethylene copolymer comprising (A2) monomer units to adjust the amount of (A2) monomer units in the composition.

Ethylene copolymers having both comonomer units (A1) and (A2) are preferably obtained by copolymerisation of ethylene, monomer units with hydrolysable groups (A1) and polar monomer units (A2). The copolymerisation of the ethylene, monomer units with hydrolysable groups (A1) and polar monomer units (A2) may be carried out under any suitable conditions resulting in copolymerisation of the monomers.

Ethylene copolymers with both (A1) and (A2) monomer units can be produced by radical initiated high pressure polymerisation. Generally, the copolymerisation of the aforementioned monomers is carried out at a temperature of about 100-300° C. and at a pressure of about 100-300 MPa in the presence of a radical initiator in a polymerisation reactor. Usually, the polymerisation is carried out continuously, preferably in a tubular reactor, or in an autoclave reactor.

Ethylene copolymers with both (A1) and (A2) monomer units may also be produced by grafting, e.g. by the methods described in U.S. Pat. Nos. 3,646,155 and 4,117,195. However, it is preferred that ethylene copolymers with both (A1) and (A2) monomer units are prepared by copolymerisation as described herein, and not by grafting. In other words, ethylene copolymers with both (A1) and (A2) monomer units are preferably non-grafted ethylene copolymers with both (A1) and (A2) monomer units.

Ethylene copolymers with both (A1) and (A2) monomer units can be a pre-produced or in-reactor produced. Pre-produced means commercially available ethylene copolymers. Preferably, the pre-produced ethylene copolymer is a blend of two or more ethylene copolymers differing from each other, more preferably is a blend of two ethylene copolymers differing from each other.

However, ethylene copolymers with both (A1) and (A2) monomer units are preferably in-reactor produced. Preferably, the reactor is a tubular reactor.

The advantage of an in-reactor produced ethylene copolymer with both (A1) and (A2) monomer units is that it can be directly used in the subsequent steps of the process of the invention.

Preferably, the monomer units with hydrolysable silane-groups (A1) are present in the ethylene copolymer composition (A) in an amount of 0.1 to 6 wt. %, more preferably in an amount of 0.2 to 5.5 wt. %, still more preferably in an amount of 0.3 to 5 wt. %, and most preferably in an amount of 0.4 wt. % to 4.5 wt. %.

Preferably, the monomer units with hydrolysable silane-groups (A1) is represented by formula (I):

$$R^1SiR^2_qY_{3-q} \qquad (I)$$

wherein
  $R^1$ is an ethylenically unsaturated hydrocarbyl, hydrocarbyloxy or (meth)acryloxy hydrocarbyl group,
  each $R^2$ is independently an aliphatic saturated hydrocarbyl group,
  Y which may be the same or different, is a hydrolysable organic group and
  q is 0, 1 or 2.

If there is more than one Y group, these do not have to be identical.

Specific examples of the monomer units with hydrolysable silane-groups (A1) are those wherein R is vinyl, allyl, isopropenyl, butenyl, cyclohexenyl or gamma-(meth) acryloxy propyl; Y is methoxy, ethoxy, formyloxy, acetoxy, propionyloxy or an alkyl- or arylamino group; and R', if present, is a methyl, ethyl, propyl, decyl or phenyl group.

A preferred monomer unit with hydrolysable silane-groups (A1) is represented by formula (II):

$$CH_2=CHSi(OA)_3 \qquad (II)$$

wherein A is a hydrocarbyl group having 1-8 carbon atoms, preferably 1-4 carbon atoms.

Most preferably, the monomer units with hydrolysable silane-groups (A1) comprise vinyl trimethoxysilane (VTMS), vinyl bismethoxyethoxysilane, vinyl triethoxysilane, gamma-(meth)acryloxypropyltrimethoxysilane, gamma(meth)-acryloxypropyltriethoxysilane, vinyl triacetoxysilane and combinations thereof.

Preferably, the polar monomer units (A2) are present in the ethylene copolymer composition (A) in an amount of 10 to 35 wt. %, more preferably in an amount of 15 to 34 wt. %, still more preferably in an amount of 17 to 33 wt. % and most preferably in an amount of 20 to 32 wt. %.

Preferably, the polar monomer units (A2) are selected from (C1-C6)-alkyl acrylate and (C1-C6)-alkyl (C1-C6)-alkylacrylate. More preferably, the polar monomer units (A2) are selected from methyl acrylate, ethyl acrylate and/or butyl acrylate. Among these, methyl acrylate (MA) is most preferred.

Preferably, the free radical generator (B) is added in an amount of from 0.01 to 1 wt. %, more preferably from 0.02 to 0.7 wt. %, more preferably from 0.05 to 0.5 wt. %, based on the total amount of cross-linkable ethylene copolymer composition (A).

Preferably, the free radical generator (B) comprises, or consists of, a peroxide. The peroxide preferably comprises, or consists of, an organic peroxide.

Preferably, the free radical generator is selected from acyl peroxide, alkyl peroxide, hydroperoxide, perester, peroxycarbonate, and mixtures thereof. Examples of suitable organic peroxides include di-tert-amylperoxide, 2,5-di(tert-butyl-peroxy)-2,5-dimethyl-3-hexyne, 2,5-di(tert-butylperoxy)-2,5-dimethylhexane, tert-butyl-cumylperoxide, di(tert-butyl)peroxide, dicumylperoxide, butyl-4,4-bis(tert-butylperoxy)-valerate, 1,1-bis(tert-butylperoxy)-3,3,5-trimethylcyclohexane, tert-butylperoxy-benzoate, dibenzoylperoxide, bis(tertbutylperoxyisopropyl)benzene, 2,5-dimethyl-2,5-di(benzoylperoxy)hexane, 1,1-di(tert-butylperoxy) cyclohexane, 1,1-di(tert amylperoxy)-cyclohexane, and any mixtures thereof; for example, the peroxide may be selected from 2,5-di(tert-butylperoxy)-2,5-dimethylhexane, di(tert-butylperoxyisopropyl)benzene, dicumylperoxide, tertbutylcumylperoxide, di(tert-butyl)peroxide, and mixtures thereof, for example, the peroxide is dicumylperoxide. Preferably, the peroxide is selected from 2,5-dimethyl-2,5-di(tert-butylperoxy)hexane, 2,5-dimethyl-2,5-di (tert-butylperoxy)hexyne-3,3,3,5,7,7-pentamethyl-1,2,4-trioxepane, 3,6,9-triethyl-3,6,9-trimethyl-1,4,7-triperoxonane, and di-tert-butyl peroxide. The person skilled in the art knows how to choose appropriate peroxide that will thermally decompose during the reactive modification process according to the present invention.

Preferably, the half life of the peroxide is 0.1 hour at a temperature of at least 94° C., preferably at least 100° C., more preferably at least 110° C., for example, the half life of the peroxide is 0.1 hour at a temperature range of from 94° C. to 220° C., preferably in the range of from 100° C. to 190° C., like in the range of from 110° C. to 175° C.

The peroxide may be used in the form of a masterbatch wherein the peroxide is fed as a pre-mix (masterbatch), preferably fed directly into the extruder.

Preferably, the peroxide is pre-mixed with a carrier which can be a polymer, e.g. polyethylene and polypropylene, or other materials, e.g. silica and $CaCO_3$, forming a masterbatch and then fed into the extruder.

Preferably, the organic peroxide comprises, or consist of, 2,5-Dimethyl-2,5-di(tert-butylperoxy)hexane, tert-Butyl peroxy-2-ethylhexanoate and/or tert-Butyl peroxy-2-ethylhexylcarbonate.

The first $MFR_2$ of the cross-linkable ethylene copolymer composition (A) is preferably from 1 to 100 g/10 min, more preferably from 1 to 50 g/10 min, still more preferably of from 10 to 40 g/10 min, and most preferably from 15 to 30 g/10 min, and/or the second $MFR_2$ of the treated cross-linkable ethylene copolymer composition (A) is preferably from 0.1 to 10 g/10 min, more preferably is from 0.5 to 5 g/10 min, more preferably 1 to 4 g/10 min, and most preferably 1.4 to 3.5 g/10 min.

Preferably, in the process of the invention the ratio between the first $MFR_2$ and the second $MFR_2$ is from 4 to 50, more preferably from 6 to 40 and more preferably from 8 to 10.

The cross-linkable ethylene copolymer composition (A) has a first $MFR_5$ and the treated cross-linkable ethylene copolymer composition (A) has a second $MFR_5$. Preferably, the second $MFR_5$ of the treated cross-linkable ethylene copolymer composition (A) is lower than the first $MFR_5$ of the cross-linkable ethylene copolymer composition (A) before treatment.

Preferably, the cross-linkable ethylene copolymer composition (A) has a first $MFR_5$ of from 15 to 200, more preferably of from 20 to 150 g/10 min, still more preferably of from 30 to 120 g/10 min, and most preferably of from 55 to 100 g/10 min.

Preferably, the treated cross-linkable ethylene copolymer composition (A) has a second $MFR_5$ of from 1 to 20, more preferably of from 2 to 18, still more preferably of from 6 to 15 g/10 min, still more preferably of from 7 to 14 g/10 min, and most preferably of from 8 to 13 g/10 min.

Preferably, in the process of the invention the ratio between the first $MFR_5$ and the second $MFR_5$ is from 2 to 30, preferably from 4 to 15 and more preferably from 5 to 8.

Preferably, the cross-linkable polyethylene composition further comprises an additive (C). The additive (C) preferably comprises an anti-slip agent, more preferably consists of an anti-slip agent. Preferably, the additive (C) is present in an amount of from 0.01 to 1 wt. %, more preferably from 0.05 to 0.7 wt. %, more preferably from 0.1 to 0.5 wt. %, based on the total cross-linkable polyethylene composition.

Preferably, the anti-slip agent comprises, or consists of, an amide compound.

Preferably, the amide compound comprises erucamide (CAS Nr. 112-84-5), stearyl erucamide (CAS Nr. 10094-45-8), ethylene-bis-oleamide (CAS Nr. 110-31-6), oleyl palmitamide (CAS Nr. 16260-09-6) or combinations thereof.

Alternatively, chalk, talc or polyethylene power can be blended with the polyethylene composition before or during a pelletising step. This reduces the stickiness of the material to be pelletised.

In step b) the free radical generator (B) can be either added directly to the cross-linkable ethylene copolymer composition (A) or as a masterbatch. Preferably, in step b) the free radical generator (B) is added as a masterbatch to the cross-linkable ethylene copolymer composition (A).

The masterbatch in addition to the peroxide usually comprises a carrier resin such as:

LDPE with polar groups in polymer chain e.g. acrylates

EVA, and/or

LLDPE.

If the used peroxide is liquid it may be delivered in such a way that it is sprayed on silica, and/or delivered in mineral oil, calcium carbonate, powder PP, paste silicone.

Liquid peroxide may also be soaked in part of the polymer to be treated and this soaked polymer is then added as "masterbatch" to the whole polymer to be treated.

Preferably, the treatment of step c) is conducted in a compounder or an extruder. Preferably, the extruder is a reactor extruder or a separate extruder downstream of a reactor, more preferably treatment of step c) is carried out in a reactor extruder, i.e. in an extruder to which cross-linkable ethylene copolymer composition (A), usually then in its preferred embodiment of consisting of one ethylene copolymer comprising both monomer units (A1) and (A2), coming directly from its production in a reactor is fed.

The treatment of step c) is preferably conducted at a temperature above the decomposition temperature of the free radical generator (B). For example, when using 2,5-Dimethyl-2,5-di(tert-butylperoxy)hexane, preferably the treatment of step c) is conducted at a temperature of between 220 to 250° C.

Preferably, the temperature in step c) is continuously increased or stepwise increased, more preferably stepwise increased.

Stepwise increased means that the treatment of step c) is conducted at a first temperature, subsequently conducted at a second temperature being higher than the first temperature. In other words, there is a temperature step from the first to the second temperature, the difference in temperature between the first and second temperature usually being between 10 and 50° C. Preferably, the first temperature is a temperature below the decomposition temperature of the free radical generator (B) and the second temperature is a temperature above the decomposition temperature of the free radical generator (B). Usually, the first temperature corresponds to or is higher than the melt temperature of the polymer to be melted. The stepwise increase in temperature has the advantage that at the first temperature a good homogenisation of the free radical generator (B) within the cross-linkable polyethylene composition is achieved. Stepwise increasing the temperature is also preferred as it minimises not only local gel formation but also potential creation of inhomogeneities and weakness spots in the melt.

In case of conducting step c) in an extruder or compounder, preferably a first part of the extruder or compounder is at the first temperature, and the second part downstream of the first part is at the second temperature.

Continuously increased means that the temperature in step c) is continuously increased to a temperature above the decomposition temperature of the free radical generator (B). Preferably, continuously increased is a linear increase of the temperature. In case of conducting step c) in an extruder or compounder, preferably the temperature is linearly increased over the length of the extruder or compounder.

The process according to the invention preferably comprises further steps to crosslink a polyethylene composition comprising the treated cross-linkable ethylene copolymer composition (A).

Preferably, the process of the invention further comprises the steps of
d) adding a silanol condensation catalyst (D) to a polyethylene composition comprising the treated cross-linkable ethylene copolymer composition (A), and
e) silane-crosslinking the polyethylene composition in the presence of the silanol condensation catalyst (D) to obtain a silane-crosslinked polyethylene composition.

The crosslinking of ethylene copolymers with hydrolysable silane units and polar monomer units is well known in the art and can be carried out by so-called moisture curing, see for example WO 00/68314. A silanol condensation catalyst is used as a catalyst.

Preferably, the silanol condensation catalyst (D) comprises, or consists of, a tin based catalyst or a sulphonic acid based catalyst, more preferably comprises, or consist of, a sulphonic acid based catalyst. The tin based catalyst is preferably dibutyl tin dilaureate (DBTL).

The sulphonic acid based catalyst is preferably represented by formula (III):

$$ArSO_3H \qquad (III)$$

or a precursor thereof, Ar being a benzene ring substituted with at least one hydrocarbyl radical such that the total number of carbon atoms of the hydrocarbyl radical(s) is 8-20, or a naphthalene ring substituted with at least one hydrocarbyl radical such that the total number of carbon atoms of the hydrocarbyl radical(s) is 4-18, and the catalyst of formula (III) containing 14-28 carbon atoms in total. This catalyst, as opposed to conventional silanol condensation catalysts, such as e.g. DBTL, allows crosslinking at ambient temperature, such as at room temperature.

Such organic sulphonic acids are described e.g. in EP736065, or alternatively, in EP1309631 and EP1309632.

Masterbatch:

Preferably, the silanol condensation catalyst (D) is present in an amount of 0.00015 to 0.045 wt. %, or 0.00000044-0.00013 mol % based on the total polyethylene composition comprising the treated cross-linkable ethylene copolymer composition (A).

If a masterbatch containing the catalyst is used, this is preferably used in an amount of 0.01 to 3 wt. %, more preferably 0.5 to 2.5 wt. %, and most preferably 0.1 to 2 wt. %, based on the total polyethylene composition comprising the treated cross-linkable ethylene copolymer composition (A).

The present invention further provides a polyethylene composition comprising, or consisting of, the treated cross-linkable ethylene copolymer composition (A) obtainable by a process as described above. All preferred embodiments described above for the process of the invention are preferred embodiments of the polyethylene composition comprising, or consisting of, the treated cross-linkable ethylene copolymer composition (A), where applicable. As already described above, the treated cross-linkable ethylene copolymer composition (A) has a second $MFR_2$ and a second $MFR_5$.

Preferably, the polyethylene composition obtained by the process as described above comprises, or consists of, an ethylene copolymer composition (A) which has a second $MFR_2$ of from 0.1 to 10 g/10 min, more preferably is from 0.5 to 5 g/10 min, more preferably 1 to 4 g/10 min, and most preferably 1.4 to 3.5 g/10 min and/or a second $MFR_5$ of from 1 to 20, more preferably of from 2 to 18, still more preferably of from 6 to 15 g/10 min, still more preferably of from 7 to 14 g/10 min, and most preferably of from 8 to 13 g/10 min and/or a Shore A value of from 50 to 90, more preferably of from 55 to 80, more preferably of from 57 to 79, and most preferably of from 58 to 78 and/or a $SHI_{eta(0.05/300)}$ value of from 85 to 150, more preferably of from 90 to 145, more preferably 95 to 140 and most preferably of from 99 to 135.

The present invention further provides a silane-cross-linked polyethylene composition obtainable by a process as described above. All preferred embodiments described above for the process of the invention are preferred embodiments of the silane-crosslinked polyethylene composition, where applicable.

Preferably, the silane-crosslinked polyethylene composition obtainable by the process as described above has a Shore A value of from 55 to 97, more preferably from 60 to 95, more preferably from 65 to 92, more preferably from 70 to 90 and most preferably from 74 to 87 and/or a compression set at 23° C. of from 8 to 35%, more preferably from 10 to 30%, still more preferably from 12 to 28%, and most preferably from 15 to 25% and/or a compression set at 70° C. of from 10 to 80%, more preferably from 15 to 75%, more preferably from 20 to 70%, and most preferably from 25 to 65%.

The invention further provides an article comprising, or consisting of, the polyethylene composition comprising, or consisting of, the treated cross-linkable ethylene copolymer composition (A) according to the invention or comprising, or consisting of, the silane-crosslinked polyethylene composition according to the invention.

Preferably, the article is a profile, a seal or a gasket.

EXAMPLES

1. Determination Methods a) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer.

The $MFR_2$ of ethylene (co-)polymers is measured at a temperature 190° C. and at a load of 2.16 kg.

The $MFR_5$ of ethylene (co-)polymers is measured at a temperature 190° C. and at a load of 5 kg.

The $FRR_{5/2.16}$ is the ratio of $MFR_5/MFR_2$.

b) Shore A

Shore A measurements are performed according to according IS0868: 2003.

The measurement was done at room temperature, sample thickness 4 mm compression moulded samples, prepared like samples for compression set but with 4 mm.

The compression moulding is normally done according EN ISO 1872-2-2007. The plaques as used herein were prepared as described hereinafter in item f).

c) Rheological Parameters

The characterization of polymer melts by dynamic shear measurements complies with ISO standards 6721-1 and 6721-10. The measurements were performed on an Anton Paar MCR501 stress controlled rotational rheometer, equipped with a 25 mm parallel plate geometry. Measurements were undertaken on compression moulded plates, using nitrogen atmosphere and setting a strain within the linear viscoelastic regime. The oscillatory shear tests were done at T 190° C. applying a frequency range between 0.01 and 600 rad/s and setting a gap of 1.3 mm.

$$\gamma(t)=\gamma_0 \sin(\omega t) \quad (1)$$

If the applied strain is within the linear viscoelastic regime, the resulting sinusoidal stress response can be given by $$\sigma(t)=\sigma_0 \sin(\omega t+\delta) \quad (2)$$

where $\sigma_0$ and $\gamma_0$ are the stress and strain amplitudes, respectively $\omega$ frequency is the angular $\delta$ is the phase shift (loss angle between applied strain and stress response)

t is the time

Dynamic test results are typically expressed by means of several different rheological functions, namely the shear storage modulus G', the shear loss modulus, G", the complex shear modulus, G*, the complex shear viscosity, $\eta^*$, the dynamic shear viscosity, $\eta'$, the out-of-phase component of the shear viscosity $\eta"$ and the loss tangent, tan $\delta$ which can be expressed as follows:

$$G' = \frac{\sigma 0}{\gamma 0} \cos \delta [Pa] \quad (3)$$

$$G' = \frac{\sigma 0}{\gamma 0} \sin \delta [Pa] \quad (4)$$

$$G^* = G' + iG''[Pa] \quad (5)$$

$$\eta^* = \eta' - i\eta''[Pa \cdot s] \quad (6)$$

$$\eta' = \frac{G''}{\omega}[Pa \cdot s] \quad (7)$$

$$\eta'' = \frac{G'}{\omega}[Pa \cdot s] \quad (8)$$

The values of storage modulus (G'), loss modulus (G"), complex modulus (G*) and complex viscosity (eta*) were obtained as a function of frequency.

Thereby, e.g. eta*0.05 rad/s is used as abbreviation for the complex viscosity at the frequency of 0.05 rad/s or eta*300 rad/s is used as abbreviation for the complex viscosity at the frequency of 300 rad/s.

Besides the above mentioned rheological functions one can also determine other rheological parameters such as the so-called elasticity index EI(x). The elasticity index EI(x) is the value of the storage modulus, G' determined for a value of the loss modulus, G" of x kPa and can be described by equation 10.

$$EI(x)=G' \text{ for } (G''=x \text{ kPa})[Pa] \quad (9)$$

For example, the EI(5 kPa) is the defined by the value of the storage modulus G', determined for a value of G" equal to 5 kPa.

The determination of the so-called Shear Thinning Indexes is done, as described in equation 10.

$$SHI(x/y) = \frac{Eta^* \text{ for } (G^* = x \text{ kPa})}{Eta^* \text{ for } (G^* = y \text{kPa})}[Pa] \quad (10)$$

For example, the SHI(2.7/210) is defined by the value of the complex viscosity, in Pa·s, determined for a value of G* equal to 2.7 kPa, divided by the value of the complex viscosity, in Pa·s, determined for a value of G* equal to 210 kPa.

The values are determined by means of a single point interpolation procedure, as defined by Rheoplus software. In situations for which a given G* value is not experimentally reached, the value is determined by means of an extrapolation, using 15 the same procedure as before. In both cases (interpolation or extrapolation), the option from Rheoplus "-Interpolate y-values to x-values from parameter" and the "logarithmic interpolation type" were applied.

d) Content of Monomer Units

The content of the polar monomer units was determined based on Fourier Transform Infrared Spectroscopy (FTIR) as known in the art. Details are given in WO 2019/086948.

The content of monomer units having hydrolysable silane-groups was determined by quantitative nuclear-magnetic resonance (NMR) spectroscopy as known in the art. Details are given in WO 2019/086948. Reference is made to A. J. Brandolini, D. D. Hills, "NMR spectra of polymers and polymer additives", Marcel Dekker Inc., 2000.

e) Gel Content

The gel content was calculated according to ASTM D 2765-01. The gel content was measured from the plaques samples for compression set measurements, see "Sample preparation and compression set" below.

d) Sample Preparation and Compression Set

The sample preparation for compression set measurement was done as follows.

The tested materials, optionally dry blended with a silanol condensation catalyst, were extruded into tapes. Tape samples were produced on a Collin extruder (Teach-Line E20T) with a temperature profile of 120-130-140° C. The tape samples had a thickness of 2 mm and a width of 40 mm.

Plaques samples for compression set were made by compression moulding the tapes to get a thickness of 6.3 mm for the compression set test and also into 4 mm and 1 mm thickness plaques for Shore A and DMTA measurements, respectively.

The plaques were compression moulded as follows:

The press was preheated to set temperature, above the melting temperature of used polymer (herein at 180° C.).

1 mm plaque: Step 1—the polymer tapes were put in the press and kept for 5 min without pressure. Step 2—the pressure was increased to 187 bar and kept at this pressure for 5 min. Step 3—the plaque was cooled down to room temperature at rate of 15° C./min at 187 bar pressure.

4 mm plaque: same procedure as for 1 mm plaque, except that tapes were kept in Step 1 for 10 min.

6.3 mm plaque: same procedure as for 1 mm plaque, except that tapes were kept in Step 1 for 15 min.

After compression moulding the plaques were merged in hot water (50° C.) for 24 hours to fully crosslink the material before measuring the compression set. The actual specimen is then cut from the plaque and fixed between two metal plates at room temperature.

The compression is set to be 25% of the thickness of the specimen by utilizing different spacers. The compressed samples are then stored at the selected temperature (23° C. or 70° C.) for 24 hours. Thereafter, the samples are moved to room temperature and released from compression. After 30 minutes of recovery at room temperature, the samples are measured to determine the compression set. The compression set is measured according to DIN ISO 815-1, method A, specimen B.

g) DMTA Measurements

The samples had a thickness of 1 mm and where prepared as described above, item f).

The characterization of dynamic-mechanic properties complies with ISO standards 6721-1, 6721-4, 6721-11. The measurements were performed on a "Netzsch DMA 242E Artemis" strain/stress-controlled dynamic mechanical Analyzer, equipped with a tensional-sample holder for rectangular specimen geometry. Measurements were undertaken on compression moulded plates under nitrogen atmosphere, using liquid nitrogen for cooling. The dynamic mechanic thermal analysis were performed in the temperature range from −170° C. to +130° C. with a heating rate of 2° C./min, a frequency of 1 Hz, in strain-stress controlled modus with a maximum dynamic applied stress of 1.80 MPa, a static load on the specimen of 0.20 MPa and a maximum strain of 0.20%. The clambing of the specimens were performed in the temperature range from −100° C. to −130° C. with a torque of 2.5 cNm per screw. The conditioning at the start-temperature of −170° C. was carried out with an isothermal section of 30 minutes, wherein the last 5 min had a change in E' equal or less than 5 MPa per minute. The evaluation was performed with the software "Proteus Thermal Analysis—Version 6.1.0"

2. Materials a) Ethylene Copolymers

The ethylene copolymers with the type and amount of comonomer(s) indicated used in the present invention are given in Table 1 below.

For Polymer A, Polymer B, Polymer C: see Table 1.

Polymer D: Ethylene-methyl acrylate copolymer comprising 24 wt. % methyl acrylate monomer units, $MFR_2$=50 g/10 min.

Polymer E: Ethylene-methyl acrylate copolymer comprising 25 wt. % methyl acrylate monomer units, $MFR_2$=0.5 g/10 min.

Polymer F: Ethylene-methyl acrylate-vinyl trimethoxysilane terpolymer comprising 21 wt. % methyl acrylate and 1.8 wt. % vinyl trimethoxysilane monomer units, $MFR_2$=1.8 g/10 min.

b) Additives

Crodamide ER and Crodamide 212 are commercially available from Company Croda.

3. Results

The following Table 1 provides an overview of the inventive (IE) and comparative (CE) examples used. IE4, IE5 and CE7 are blends of two polymers as indicated in Table 1 below.

TABLE 1

| Example | Polymer(s) | Comonomer(s) Type(s) | Content, wt. % | Additive | $MFR_2$, g/10 min | $MFR_5$, g/10 min |
|---|---|---|---|---|---|---|
| IE1 | Polymer A | MA/VTMS | 30/2.2 | Crodamide ER 5000 ppm | 29 | 99 |
| IE2 | Polymer B | MA/VTMS | 26/2.5 | | 16.3 | 56.4 |
| IE3 | Polymer C | MA/VTMS | 22.7/4.5 | Crodamide 212 2033 ppm | 24.6 | 84 |
| IE4 | 22 wt. % Polymer C + 78 wt. % Polymer D | MA/VTMS | 23.7/1 | | 47 | |

TABLE 1-continued

| Example | Polymer(s) | Comonomer(s) Type(s) | Content, wt. % | Additive | MFR$_2$, g/10 min | MFR$_5$, g/10 min |
|---|---|---|---|---|---|---|
| IE5 | 45 wt. % Polymer A + 55 wt. % Polymer D | MA/VTMS | 26.7/1 | | 38 | |
| CE6 | Polymer F | MA/VTMS | 21/1.8 | | 1.8 | 6.9 |
| CE7 | 45 wt. % Polymer B + 55 wt. % Polymer E | MA/VTMS | 23.2/1 | | 1 | 4.3 |

MA-methyl acrylate,
VTMS-vinyl trimethoxy silane

Table 1-1 below shows rheological properties of inventive examples IE1 to IE3 from Table 1.

TABLE 1-1

Rheological properties of inventive examples IE1 to IE3

| | IE1 | IE2 | IE3 |
|---|---|---|---|
| eta(0.05 rad/s), Pa · s | 2048 | 2323 | 3997 |
| eta(300 rad/s), Pa · s | 104 | 144 | 91 |
| SHI | | | |
| eta(1 kPa), Pa · s | 559 | 906 | 615 |
| eta(2.7 kPa), Pa · s | 378 | 641 | 353 |
| eta(5 kPa), Pa · s | 288 | 501 | 254 |
| eta(1 kPa)/eta(5 kPa) | 1.94 | 1.81 | 2.42 |

2,5-Dimethyl-2,5-di(tert-butylperoxy)hexane (POX) was mixed to inventive examples IE1 to IE5 in the amounts indicated in Table 2 below.

The POX was not directly added, but base material was soaked with liquid POX and the soaked material was added as a masterbatch during the compounding. The compounding was done on a twin screw extruder ZSK18 Coperion, screw speed 300 rpm, temperature zones 1-8 20/170/190/210/230/240/230/220° C. The soaked material was added via side feeder.

The temperatures in the extruder were such that resulted in decomposition of the POX and causing a molecular weight enlargement of the inventive copolymers. Properties of the obtained molecular weight enlarged inventive examples IE1-1 to IE5-1 are given in Table 2 below.

TABLE 2

Samples after molecular weight enlargement, i.e. after treatment with peroxide

| | IE1-1 | IE2-1 | IE3-1 | IE4-1 | IE5-1 |
|---|---|---|---|---|---|
| POX, wt. % | 0.39 | 0.36 | 0.30 | 0.60 | 0.44 |
| MFR$_2$, g/10 min | 3.3 | 1.9 | 2.65 | 1.4 | 2.55 |
| MFR$_5$, g/10 min | 12.9 | 9.25 | 13.4 | 8.86 | 11.9 |
| FRR5/2.16 | 3.9 | 4.9 | 5.1 | 6.3 | 4.7 |
| Gel content | 0.13 | 0.21 | 0.51 | 0.34 | 0.21 |
| Shore A | 59 | 59.6 | 72.6 | 77.1 | 70.5 |
| eta(0.05 rad/s), Pa · s | 14122 | 20011 | 18942 | 20755 | 19384 |
| eta(300 rad/s), Pa · s | 142 | 208 | 141 | 159 | 156 |
| SHI | 99.5 | 96.2 | 134.3 | 130.5 | 124.3 |

TABLE 2-continued

Samples after molecular weight enlargement, i.e. after treatment with peroxide

| | IE1-1 | IE2-1 | IE3-1 | IE4-1 | IE5-1 |
|---|---|---|---|---|---|
| eta(1 kPa), Pa · s | 7470 | 19220 | 53285 | | |
| eta(2.7 kPa), Pa · s | 2335 | 5549 | 2585 | | |
| eta(5 kPa), Pa · s | 1281 | 3044 | 1326 | | |
| eta(1 kPa)/eta(5k Pa) | 5.83 | 6.31 | 40.18 | | |
| G', −100° C. | 2000 | 2600 | 2385 | 2743 | 2769 |
| G', −50° C. | 1305 | 1673 | 1611 | 1783 | 1754 |
| G', 23° C. | 8.5 | 13.5 | 17.4 | 23.6 | 17.3 |
| G', 50° C. | 2.4 | 4.2 | 5.1 | 6.9 | 5.1 |

As can be seen from comparing Table 1-1 (examples before POX treatment) with Table 2 (POX treated examples), POX treatment causes molecular weight enlargement which results in increased shear thinning performance for all the POX treated inventive examples IE1 to IE3 compared to the non-treated, as demonstrated by SHI, FRR$_{5/2.1}$6 and eta(1 kPa/5 kPa).

After extrusion, inventive examples IE1-1 to IE5-1 as well as comparative examples CE6 and CE7 have been formed into plaques of 6.3 mm thickness as described above. The properties of the thus obtained plaques of inventive examples IE1-2 to IE5-2 and CE6-2 and CE7-3 are given in Table 3 below.

TABLE 3

Properties of plaques after blending with silanol condensation catalyst before silane-crosslinking

| | IE1-2 | IE2-2 | IE3-2 | IE4-2 | IE5-2 | CE6-2 | CE7-2 |
|---|---|---|---|---|---|---|---|
| Shore A | 59.5 | 70.2 | 73.3 | 77.3 | 70.5 | 81 | 82 |
| G', −50° C., MPa | 1377 | 1798 | 1673 | 1783 | 1679 | 1792 | 1776 |
| G', 23° C., MPa | 9.9 | 15.7 | 19.7 | 26 | 19.5 | 36 | 33 |
| G', 50° C., MPa | 3.3 | 5.3 | 6.2 | 7.9 | 6.1 | 12 | 11 |
| Compression set, 23° C., % | 23.6 | 23.2 | 25.2 | 30.6 | 28.7 | 25.8 | 26.9 |
| Compression set, 70° C., % | 97.2 | 90.7 | 89 | 85.8 | 84.3 | 88 | 89 |

IE1-2 to IE5-2 as well as comparative examples CE6-2 and CE7-2 were crosslinked in the presence of 2 wt. % of silanol condensation catalyst masterbatch Ambicat LE4476 (corresponding to 0.03 wt. % of pure catalyst) which is commercially available from Borealis. Cross-linking was performed at constant room temperature at 23° C. and 50% RH (relative humidity) for 168 hrs. All examples have been formed into plaques of 6.3 mm thickness as described above.

The properties of the silane-crosslinked examples are given in Table 4 below.

TABLE 4

Properties of plaques after silane-crosslinking

|  | IE1-3 | IE2-3 | IE3-3 | IE4-3 | IE5-3 | CE6-3 | CE7-3 |
|---|---|---|---|---|---|---|---|
| Shore A | 74.1 | 80.6 | 86.6 | 81.5 | 76.6 | 87 | 84 |
| G', −50° C., MPa | 1556 | 1746 | 1745 | 1818 | 1811 | 1575 | 1689 |
| G', 23° C., MPa | 13.7 | 20.5 | 30.6 | 27.6 | 20.4 | 40 | 31 |
| G', 50° C., MPa | 7.2 | 10.4 | 18.5 | 10.3 | 8 | 18 | 12 |
| G', 70° C., MPa | 4 | 5.78 | 10.85 | 4.72 | 3.95 | 9.44 | 6.01 |
| G", −50° C., MPa | 170.15 | 119.3 | 113.89 | 110.14 | 110.62 | 111.39 | 90.88 |
| G", 23° C., MPa | 1.31 | 2.2 | 2.8 | 3.64 | 2.59 | 5.3 | 4.12 |
| G", 50° C., MPa | 0.38 | 0.5 | 0.81 | 0.9 | 0.69 | 1.18 | 0.93 |
| G", 70° C., MPa | 0.14 | 0.19 | 0.24 | 0.3 | 0.24 | 0.32 | 0.32 |
| tan δ, −50° C. | 0.109 | 0.068 | 0.065 | 0.061 | 0.061 | 0.071 | 0.054 |
| tan δ, 23° C. | 0.096 | 0.107 | 0.092 | 0.132 | 0.127 | 0.133 | 0.133 |
| tan δ, 50° C. | 0.053 | 0.048 | 0.044 | 0.087 | 0.086 | 0.066 | 0.078 |
| tan δ, 70° C. | 0.035 | 0.048 | 0.044 | 0.087 | 0.086 | 0.066 | 0.078 |
| J, −50° C., 1/MPa | 0.05 | 0.12 | 0.13 | 0.15 | 0.15 | 0.13 | 0.20 |
| J, 23° C., 1/MPa | 7.98 | 4.24 | 3.90 | 2.08 | 3.04 | 1.42 | 1.83 |
| J, 50° C., 1/MPa | 49.86 | 41.60 | 28.20 | 12.72 | 16.80 | 12.93 | 13.87 |
| J, 70° C., 1/MPa | 204.08 | 160.11 | 188.37 | 52.44 | 68.58 | 92.19 | 34.07 |
| Compression set, 23° C., % | 15.4 | 16.8 | 16.6 | 25 | 22.4 | 20.6 | 25.6 |
| Compression set, 70° C., % | 32.3 | 31.2 | 27.6 | 63.5 | 59.4 | 37.2 | 60.8 |
| Gel content | 88 | 92 | 94 | 52 | 65 | 97 | 63 |

As can be seen from Table 4, the compression set properties have improved with the molecular weight enlargement treatment. All crosslinked samples IE1 to IE3 with VTMS level of around 2% and above show lower compression set versus CE6 at 70° C. and at 23° C. All crosslinked samples IE4 and IE5 with VTMS level of around 1% show lower compression set versus CE7 at 23° C.

Also, the Shore A values of IE4 is lower than that of CE7, and the Shore A value of IE3 lower than that of CE6.

The invention claimed is:

1. Process for producing a polyethylene composition, comprising the steps of
    a) providing a cross-linkable ethylene copolymer composition (A) having a first MFR2, comprising
    (A1) monomer units with hydrolysable silane-groups, and
    (A2) polar monomer units,
    b) adding a free radical generator (B) in an amount of from 0.01 to 1 wt. % to the cross-linkable ethylene copolymer composition (A),
    c) treating the cross-linkable ethylene copolymer composition (A) with the free radical generator (B) to obtain a treated cross-linkable ethylene copolymer composition (A) having a second MFR2,
    wherein the second MFR2 is lower than the first MFR2, and wherein the first MFR2 of the cross-linkable ethylene copolymer composition (A) is from 10 to 100 g/10 min and/or the second MFR2 of the treated cross-linkable ethylene copolymer (A) composition is from 0.1 to 10 g/10 min.

2. The process according to claim 1, wherein the first MFR2 of the cross-linkable ethylene copolymer composition (A) is from 1 to 50 g/10 min and/or the second MFR2 of the treated cross-linkable ethylene copolymer (A) composition is from 0.5 to 5 g/10 min.

3. The process according to claim 1, wherein the monomer units with hydrolysable silane-groups (A1) are present in the ethylene copolymer composition (A) in an amount of 0.1 to 6 wt. % and/or wherein the polar monomer units (A2) are present in the ethylene copolymer composition (A) in an amount of 10 to 35 wt. %.

4. The process according to claim 1, wherein the monomer units with hydrolysable silane-groups (A1) are represented by formula (I):

wherein
    R1 is an ethylenically unsaturated hydrocarbyl, hydrocarbyloxy or (meth)acryloxy hydrocarbyl group, each R2 is independently an aliphatic saturated hydrocarbyl group, Y which may be the same or different, is a hydrolysable organic group and q is 0, 1 or 2.

5. The process according to claim 1, wherein the polar monomer units (A2) are selected from (C1-C6)-alkyl acrylate and (C1-C6)-alkyl (C1-C6)-alkylacrylate.

6. The process according to claim 1, wherein the free radical generator (B) comprises a peroxide.

7. The process according to claim 1, wherein the treatment of step c) is conducted in the reactor extruder.

8. The process according to claim 1, further comprising the steps of
    a) adding a silanol condensation catalyst (D) to a polyethylene composition comprising the treated cross-linkable ethylene copolymer composition (A), and
    b) silane-crosslinking the polyethylene composition in the presence of the silanol condensation catalyst (D) to obtain a silane-crosslinked polyethylene composition.

9. The process according to claim 8, wherein the silanol condensation catalyst (D) is present in an amount of 0.01 to 3 wt. % based on the total amount of a polyethylene composition comprising the treated cross-linkable ethylene copolymer composition (A).

10. The process according to claim 1, wherein the free radical generator (B) comprises an organic peroxide.

* * * * *